United States Patent [19]

Jordan

[11] Patent Number: 5,334,241

[45] Date of Patent: Aug. 2, 1994

[54] ORGANOPHILIC CLAY AND METHOD FOR ITS MANUFACTURE

[75] Inventor: Frank W. Jordan, Clarkston, Mich.

[73] Assignee: T.O.W. Inc., Clarkston, Mich.

[21] Appl. No.: 964,668

[22] Filed: Oct. 22, 1992

[51] Int. Cl.$^5$ ............................................. C04B 14/04
[52] U.S. Cl. ...................................... 106/487; 501/148
[58] Field of Search ......................... 106/487; 501/148

[56]    References Cited
U.S. PATENT DOCUMENTS

| | | | |
|---|---|---|---|
| 2,531,427 | 11/1950 | Klauser | 556/9 |
| 2,531,440 | 11/1950 | Jordan | 252/28 |
| 3,049,498 | 8/1962 | Sawyer | 252/315.2 |
| 3,403,037 | 9/1968 | Cowan et al. | 106/38.6 |
| 3,422,185 | 1/1969 | Kuritzkes | 424/61 |
| 3,449,248 | 6/1969 | Butcosk | 252/21 |
| 4,695,402 | 9/1987 | Finlayson et al. | 106/487 |
| 4,857,491 | 8/1989 | Goodman | 106/487 |
| 4,929,580 | 5/1990 | Jones | 106/487 |
| 5,075,033 | 12/1991 | Cody et al. | 106/487 |
| 5,110,501 | 5/1992 | Knudson, Jr. et al. | 252/315.2 |

FOREIGN PATENT DOCUMENTS 902701  1/1991  South Africa .

OTHER PUBLICATIONS

"Kolloid-Zeitschrift", *Organophilic Bentonites III*, Jordan and Williams, Apr. 9, 1954, pp. 40–48.

*Primary Examiner*—Karl Group
*Assistant Examiner*—Scott L. Hertzog
*Attorney, Agent, or Firm*—Krass & Young

[57] ABSTRACT

An organically modified clay is manufactured by a process wherein a clay having an exchangeable, cationic species therein is combined with a cationic organic material, subjected to a high confining pressure and mixed while under pressure so as to promote an ion exchange reaction whereby the cationic species is incorporated into the clay.

7 Claims, 1 Drawing Sheet

ORGANOPHILIC CLAY AND METHOD FOR ITS MANUFACTURE

FIELD OF THE INVENTION

This invention relates generally to clays and specifically to clays having use as thickeners and gelling agents. More specifically, the invention relates to an improved, organically modified clay which is suitable for thickening organic materials. The invention also relates to a method for the manufacture of the improved clay.

BACKGROUND OF THE INVENTION

Certain colloid clays will swell in water to many times their dry volume and as such have utility as gelling or thickening agents for control of the rheological properties of a variety of materials. These naturally occurring clays are generally not compatible with a number of organic based compositions with regard to the control of rheological properties. Hence, it is necessary to organically modify these clays to make them compatible with organic materials, and such clays are generally referred to as "organophilic" clays or "organo-clays." These clays have a large number of uses for thickening organic compositions such as paints, lubricants, cable filling compositions and the like.

The basic starting material used to make organophilic clay is an exchangeable clay of the smectite group and can include montmorillonite, (commonly known and mined as bentonite), hectorite, saponite, attapulgite and sepiolite. These clays include exchangeable cationic species such as sodium, potassium or calcium ions on their species such as sodium, potassium or calcium ions on their surface. In the course of manufacturing an organophilic clay, at least a portion of these exchangeable cationic species are substituted by an organic cation such as a quaternary amine, an organophosphorus ion or the like. The addition of the organic group modifies the clay making it compatible with organic compositions and in general allowing it to provide rheological modification in select organic fluids.

There is a large body of prior art relating to the manufacture of organophilic clays. For example, U.S. Pat. Nos. 2,531,427 and 2,531,440 both disclose general processes for the manufacture of organically substituted clays. U.S. Pat. No. 5,110,501 discloses a later process for preparing an organophilic clay in which a slurry of clay is subjected to high shear in a Manton-Gaulin Homogenizer.

In general, clays are characterized by a complicated microstructure in which lamellar sheets of material are stacked, folded, or pleated into complex layered structures. Conventional wisdom has heretofore taught that in order to manufacture a high quality, organically substituted clay it is necessary to process the clay under very high shear conditions and in the form of a slurry or dispersion so as to open the lamellar structure and permit the ion exchange reaction to take place in the aqueous medium. In general, the final product of such reactions is sold and used in the form of a pulverized material; therefore, processing in a liquid or slurry state necessitates filtration, dewatering and drying steps. Clearly, it would be desirable to carry out processing on a material having a low water content. Previous attempts have been made to prepare organophilic clays by mixing non-slurried clays with the appropriate reagents; however, products produced by such prior art processes have low degrees of organic substitution and they delaminate poorly in use and they provide low quality performance.

There is a need for a method whereby organically substituted clays may be manufactured in a process which does not require the starting clay to be in the form of a dispersion or slurry. It is further desirable that any such process be amenable to operation on a continuous basis and that it be capable of producing high quality modified clay. The present invention, as will be explained in greater detail hereinbelow, provides a method whereby dry clay may be efficiently reacted with an organic cation to thereby render it organophilic. The processing equipment is simple in construction and readily amenable to continuous operation. The modified clay produced by the present invention is of very high quality; and most notably when it is incorporated in a hydrocarbon oil, it produces a thickened gel characterized by a dielectric constant which is temperature invariant over a large range. These and other advantages of the present invention will be readily apparent from the drawings, discussion and description which follow.

BRIEF DESCRIPTION OF THE INVENTION

There is disclosed herein a method for the manufacture of an organically substituted clay. The method comprises the steps of disposing a volume of a clay, having an exchangeable cationic species therein, in a reaction vessel; disposing a cationic organic material in the vessel, subjecting the clay and cationic material to a high confining pressure and mixing the clay and cationic organic material in the vessel while maintaining said high confining pressure. As a result of the foregoing, at least some of the exchangeable cationic species in the clay are substituted by the cationic organic material to produce an organophilic clay.

In a further embodiment, a dispersant material is mixed with the cationic organic material and clay under the conditions of high confining pressure. In other embodiments of the invention, the clay and cationic organic material, and optionally the dispersant material, are premixed prior to being subjected to high confining pressure and subsequent reactive mixing.

The method of the present invention may be carried out in a batch or continuous mode process and the material produced thereby may be recycled through the process for further reaction. The clay may comprise a member selected from the group consisting of montmorillionite, hectorite, saponite, attapulgite, sepiolite and combinations thereof. The cationic organic material may comprise a compound of the general formula $(M-R_4+X-)$, wherein M is nitrogen or phosphorous, R is alkyl, aryl, or alkyl-aryl and X is halogen or methyl sulfate. The dispersant may comprise neopentyl glycol, pentaerythritol, hydrogenated castor oil, sulfonated castor oil, toluene sulfonamide, tri-alkoxy-phosphate and combinations thereof.

The invention also comprises an organically substituted clay manufactured by the foregoing method. The clay is characterized in that when 5 to 10% thereof, on a weight basis, is mixed with a petroleum oil to provide a thickened gel, the dielectric constant of the gel is essentially constant over a temperature range of 70°–300° F.

DETAILED DESCRIPTION OF THE INVENTION

Figure 1:
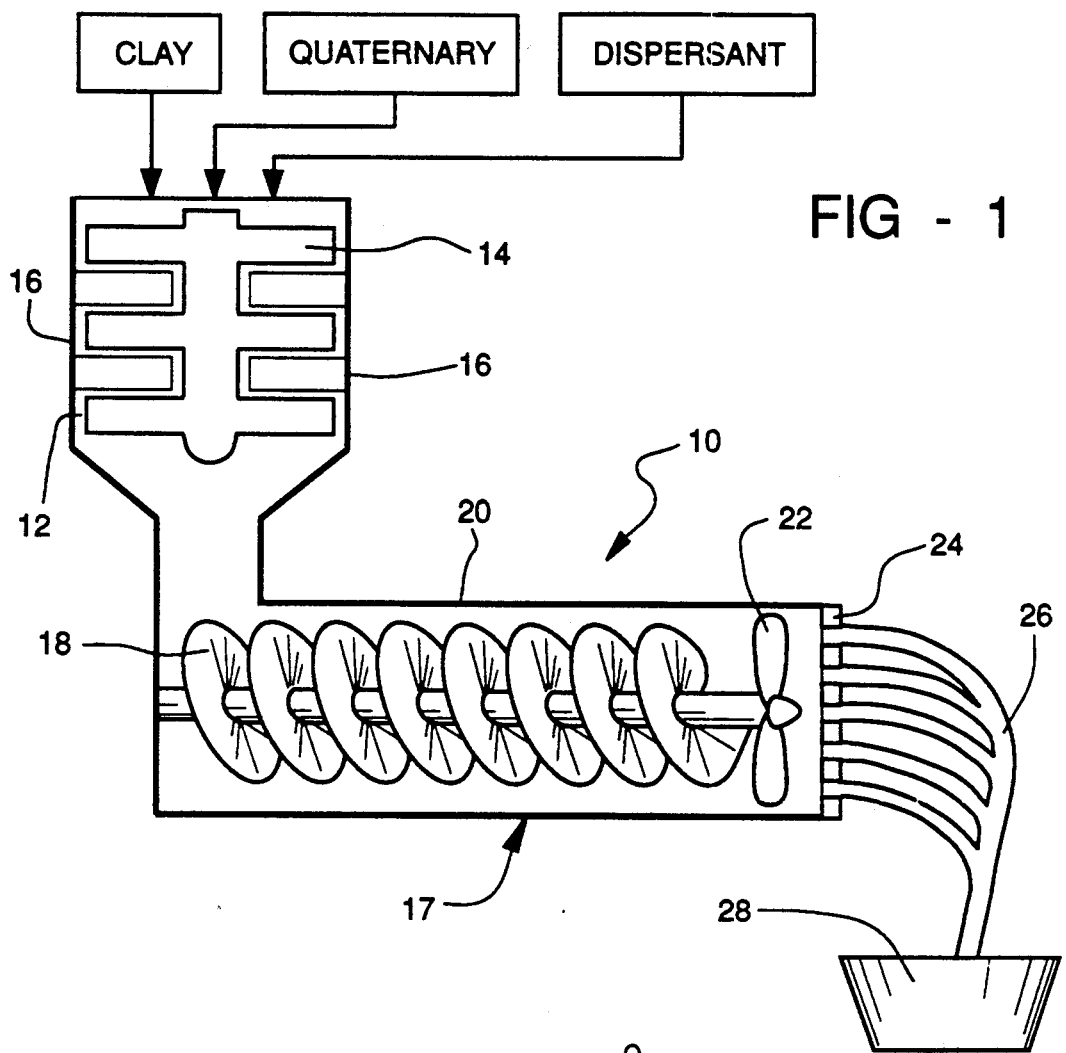
FIG. 1 is a schematic depiction of one particular apparatus which may be employed in the practice of the present invention.

In accord with a first aspect of the present invention, there is provided an improved method for the manufacture of an organophilic clay. The method is preferably carried out on smectite group clays as set forth hereinabove, and one particularly preferred type of clay is montmorillonite, also known as bentonite. The clay is reacted with an organic cation typically referred to as a quaternary compound. This material has a general formula: $(M-R^1-R-R^2R^3-R^4)+X^-$ wherein M is a polyvalent element such as nitrogen, phosphorous or the like, which can form an organically substituted cation. $R^1$-$R^4$ are organic substituents which may comprise alkyl groups, aryl groups and derivatives thereof including mono or polyhydroxy, carboxy, or sulfoxy groups and the like. X is the associated anion and it may comprise a halogen, methyl sulfate and others as is will known to those of skill in the art. In one typical group of quaternary compounds, $R^1$ and $R^2$ are methyl and $R^3$ and $R^4$ are fatty alkyls. In other embodiments, $R^1$ and $R^2$ are methyls, $R^3$ is a fatty alkyl and $R^4$ is a benzyl, or benzyl derivative, group. In yet other embodiments, $R^1$ may be methyl and $R^2$ and $R^3$ fatty alkyls with $R^4$ being a benzyl, or benzyl derivative, grouping. In a most preferred quaternary compound N is nitrogen, $R^1$ and $R^2$ are methyl and $R^3$ and $R^4$ are $C_nH_{2n+1}$ wherein n is 14 to 18; and X is $Cl^-$.

It is generally preferred that a dispersing agent be incorporated in the final product. This agent acts in a manner akin to a surfactant to optimize the thickening action of the organoclay. The dispersing agent may comprise: a low molecular weight polyhydroxylated compound such as pentaerythritol or neopentyl glycol; organic waxes such as hydrogenated castor oil as well as mono and polysulfonated materials such as sulfonated castor oil. The dispersing agent may also be a plasticizer, toluene sulfonamide, tri-alkoxy-phosphate and similar compounds.

The precise portions of the foregoing reactants will depend upon the nature of the clay, i.e., the number of exchangeable cations, the specific quaternary compound employed and the desired properties of the final modified clay. In general, the ratio of clay to quaternary is independent of the amount of dispersing agent. For 100 grams of clay (calculated on a dry basis) the amount of quaternary (calculated on a basis of 75% activity) required maybe as low as 20 grams or as high as 175 grams. It is generally preferred that 40 to 60 grams of quaternary (on a 75% active basis) be employed for every 100 grams of clay on a dry basis. In general, the ratio of dispersing agent to the clay-quaternary weight comprises approximately 0.1 to 50% by weight of finished product. A most preferred range comprises 3 to 15%.

Prior art processing techniques generally require the clay to be dispersed in water and then separated from non-clay components such as grit, sand and the like, either by settling or centrifuging. The clay slurry is then heated and reacted with a calculated amount of quaternary compound to produce an organoclay precipitate which is filtered, dewatered and dried. In general, the dispersing agent is added to the precipitate after filtration but before drying. In the final step of prior art processing, the dried material is pulverized.

The present invention recognizes the fact that slurry formation and settling or centrifuging is not necessary and that a highly efficient reaction may be carried out on dry clay provided the mixture of clay and quaternary compound is subjected to thorough mixing while maintained under very high confining pressure. This combination of processing conditions results in the highly efficient incorporation of the organic cation into the clay. The dispersing agent can be added either during or after the processing, and is preferably added during the processing.

The present invention will be illustrated with reference to FIG. 1, which schematically depicts a system for manufacturing organically modified clay in accord with the principles of the present invention. The system 10 of FIG. 1 operates to confine the clay and quaternary compound, and optionally the dispersant, under very high pressure conditions while permitting thorough mixing of that material. As illustrated, the apparatus 10 of FIG. 1 includes a first premixing station 12 wherein clay, quaternary and dispersant are blended together to form a fairly homogeneous mixture. The premixer 12 may comprise a ribbon blender or a Z type batch mixer or, as in the illustrated embodiment, a continuous mixer such as a pug mixer. The clay, quaternary and dispersant are metered into the mixer 12 and blended by the combined action of a rotor 15 cooperating with stationary fingers 16.

The mixture of clay, quaternary and dispersant passes from the premixer 12 to a high pressure mixing station 17. The high pressure mixing station is somewhat similar to an extrusion apparatus insofar as it includes an extrusion auger 18 operating within a vessel shell 20. The auger 18 receives the mixed clay, quaternary and dispersant from the premixer 12. Rotation of the auger 18 propels the clay mixture through the vessel 20 and at the same time creates a very high confining pressure therein. At the downstream end of the vessel 20 a mixing blade assembly 22 is disposed so as to thoroughly stir the highly compressed clay-quaternary-dispersant mixture. It will be noted that the downstream end of the mixing station 17 is closed by a perforated extrusion plate 24. The plate 24 includes a plurality of openings therein and serves to permit exit of the mixed material therefrom. By the proper choice of auger 18, vessel 20 and extrusion plate 24, the confining pressure, degree of mixing and extrusion rate of finished product is controllable. In general, confining pressures of 3000 to 8000 psi, at least in those regions of the apparatus proximate the mixing blade will suffice. In some instances, higher or lower pressures may be employed. As will be noted, the reactant clay 26 exits the extrusion plate and is collected in a hopper 28. The final product may be either recycled through the same apparatus, or through a second reactor, to provide still a higher degree of reaction or it may proceed onto further processing.

In carrying out the mixing it has been found that significant temperature rises occur, and it is important to avoid overheating. Some heating is desirable; however, excess heat could decompose the resultant product. It has generally been found that the high pressure, high mixing conditions do cause significant temperature elevations and it is frequently necessary to provide water cooling to the mixing vessel, as for example by use of exterior water lines or jackets, or to carefully monitor the mixing speeds and pressures. It is generally desirable to maintain temperatures near, but not exceeding, 180° F.

When the reaction of the clay and quaternary compound is complete, the resultant product is milled to reduce its particle size to a usable range. The reacted material is fairly soft and consequently a high speed impact milling process is most effective. One particularly preferred type of mill is an impact mill having a rotating element which moves past a stationary element at a tip speed of at least 15,000 feet per minute and preferably at least 25,000 feet per minute. Air jet mills are well known in the art and may also be employed for milling the final product. As is known in the art, it is generally desirable to classify the particle size of the milled product and a variety of such equipment may be employed, either in combination with the milling, or subsequent to the milling, to classify the final product on the basis of particle size, and to re-mill the oversized material. Since the present invention obviates the need for slurrying the clay; sand, grit or other particulates may be present in the final product. These materials can abrade the mill; hence, it may be desirable to coat the appropriate working surfaces of the mill with carbides or other hard materials.

FIG. 1 depicts a continuous process using a premixer 12 in line with an extrusion type pressure mixing apparatus 17. It will be appreciated that in keeping with the present invention, the process may be carried out using other apparatus. For example, a batch type mixer such as a Banbury mixer may be used to provide the high pressure confinement pressure and mixing. In general, for reasons of throughput and economy it is desirable to premix the reactants as shown in FIG. 1; although this step is not always necessary. The reactants may simply be charged into the high pressure mixture especially as in a batch situation and mixed under high pressure conditions until reaction is complete.

The organophilic clays produced by the present invention manifest properties which in some instances exceed the properties of organophilic clay manufactured in accord with the prior art slurry processes. In accord with the present invention, a sample of organically modified clay was prepared by combining 100 grams of montmorillonite clay (on a dried basis) with 60 grams of a quaternary amine (on a 75% active basis) of the formula: $(N-(CH_3)_2(C_nH_{2n+1})_2)^+Cl^-$, wherein n equals 14 to 18; together with 8 grams of a neopentyl glycol dispersant. Reaction was carried out by premixing the materials in a pug mixer and then processing them through an extrusion type pressure mixture of the type shown at reference numeral 16 is FIG. 1. It is estimated that the confining pressure was in the range about 5000 psi. The thus produced material was milled to a particle size of approximately 325 mesh.

The material produced in this example was tested to determine its suitability for use in a cable filling application as a gelling agent for a hydrocarbon oil. It is known an the art to enclose telephone cables and the like in a sheath which is filled with a protective composition operative to prevent moisture or other ambient species from attacking the cable. Such cable filling compositions primarily comprise gelled oil and can also include water scavengers and other such materials. It is most important, particularly in telephonic applications, that the cable filling composition provide a stable electrical environment. Dielectric constant is a very important parameter of the cable, since changes in dielectric constant will strongly influence signal propagation. Cables are typically exposed to a variety of changing atmospheric conditions; therefore, it is necessary that any cable filling composition have a stable dielectric constant over a large temperature range.

In order to evaluate the material produced by the present invention, it was incorporated into a representative cable filling composition comprising 10% of the clay together with 90% of the remaining constituents namely petroleum oil sold by the Penreco Co. under the name Drakeol 34 together with ancillary ingredients as noted above. This was compared with a similar composition thickened with a commercially available, prior art organoclay sold under the name Baragel 24 and with two other organoclay based compositions as well as with fumed silica thickened compositions. The Dielectric constant of these materials was measured by disposing a length of two conductor, insulated wire in a container of the material under evaluation and measuring the capacitance as a function of temperature.

Figure 2:
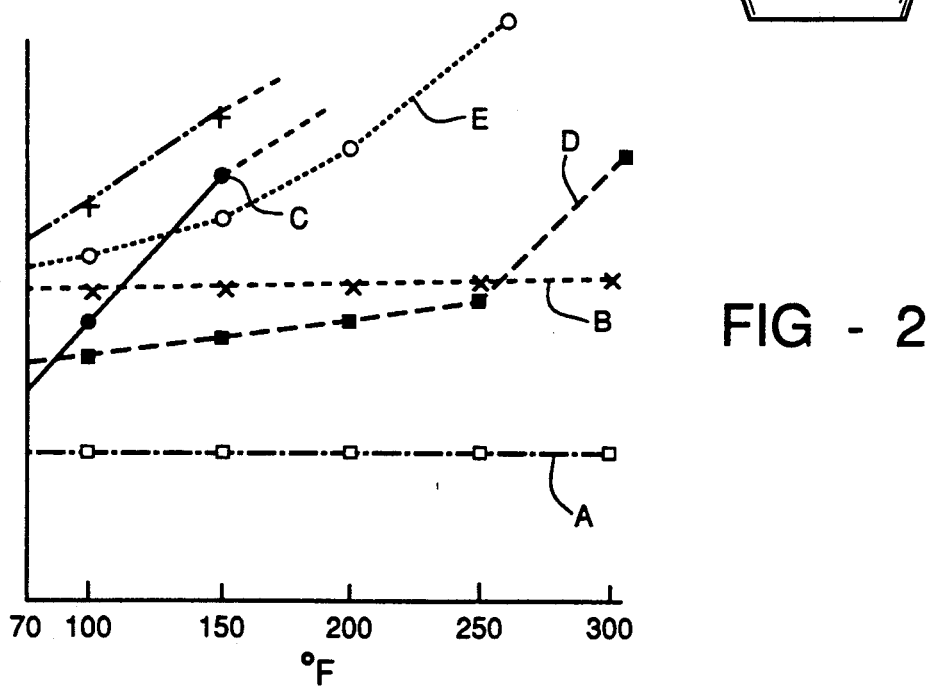
FIG. 2 is a graph depicting dielectric constant as a function of temperature for a number of thickened oil compositions including prior art compositions as well as a composition in accord with the present invention.

The data generated thereby is summarized in the graph of FIG. 2, Curve A depicts data for the composition of the present invention and it will be noted that dielectric constant is invariant over the temperature range of 70° to 300° F. Curve B is representative of the results for the fumed silica composition. It will be noted that the dielectric constant of this material is almost invariant over the temperature range; however, fumed silica is difficult to handle and expensive. Curve C shows the experimental data for the prior art Baragel 24 organoclay and it will be noted that the dielectric constant of this mixture rises very rapidly; consequently, a complete set of data could not be established.

Curves D and E are both for other presently employed prior art organoclay cable filling compositions and it will be noted that the dielectric constant thereof is highly unsatisfactory. Curve F is a representation of the data for a waxed based thickener manufactured by the Rheox Corporation. It will be noted that the dielectric constant thereof varied greatly and that extended data could not be collected.

It will be seen from the foregoing that the present invention provides an improved method for manufacturing organophilic clays and that the material manufactured by the present invention has unique properties superior to those of materials manufactured by conventional prior art processes. The material has particular utility as a cable filling composition since it provides a gelled oil having a remarkably uniform dielectric constant over a very large temperature range.

It is to be understood that the invention may be practiced other than as illustrated herein. The foregoing drawings, discussion and description are merely meant to illustrate the invention and are not meant to be limitations on the practice thereof. It is the following claims, including all equivalents, which define the scope of the invention.

I claim:

1. A method of manufacturing an organically substituted clay comprising the steps of:
   premixing a substantially, non-slurried volume of clay having an exchangeable cationic species with a volume of a cationic organic material and, thereafter, subjecting said non-slurried mixture to a confining pressure of about 3,000 psi to at least about 8,000 psi while simultaneously further mixing said volumes so that at least some of the exchangeable cationic species in said clay are substituted by said cationic organic material and said mixture is warmed and plastic.

2. An organically substituted clay manufactured by the process of claim 1, said clay characterized in that when 2 to 20% thereof, on a weight basis, is mixed with a petroleum oil to provide a thickened gel, the dielectric constant of said gel is essentially constant over a temperature range of 70°–300° F.

3. A method as defined in claim 1 including the further step of adding a dispersant material to the non-slurried mixture during the premixing step.

4. A method as defined in claim 1, wherein the clay is selected from the group consisting of montmorillonite, hectorite, saponite, attapulgite, sepiolite, and combinations thereof.

5. A method as defined in claim 1 wherein the cationic organic material is of the general formula $(M-R_4)^+X^-$ wherein M is nitrogen or phosphorous, R is alkyl, or alkyl-aryl and X is halogen or methyl sulfate.

6. A method as defined in claim 1 wherein the dispersant is a material selected from the group consisting of: neopentyl glycol, pentaerythritol, hydrogenated castor oil, sulfonated castor oil, toulene sulfonamide, trialkoxy-phosphate and combinations thereof.

7. A method as defined in claim 1 wherein the premixing step is carried out at a lower pressure than the further mixing step and said further mixing step is carried out with the use of an extruder.

* * * * *